United States Patent
Azevedo et al.

(10) Patent No.: US 7,562,265 B2
(45) Date of Patent: Jul. 14, 2009

(54) METHOD, APPARATUS AND PROGRAM STORAGE DEVICE FOR PROVIDING SELF-QUIESCED LOGIC TO HANDLE AN ERROR RECOVERY INSTRUCTION

(75) Inventors: Michael J. Azevedo, San Jose, CA (US); Hugh W. McDevitt, San Jose, CA (US); Carol Spanel, San Jose, CA (US); Andrew D. Walls, San Jose, CA (US)

(73) Assignee: International Business Machines Corporation, armonk, NY (US)

( * ) Notice: Subject to any disclaimer, the term of this patent is extended or adjusted under 35 U.S.C. 154(b) by 517 days.

(21) Appl. No.: 10/807,075

(22) Filed: Mar. 23, 2004

(65) Prior Publication Data

US 2005/0229019 A1 Oct. 13, 2005

(51) Int. Cl.
*G06F 11/00* (2006.01)

(52) U.S. Cl. ............... 714/55; 714/2; 714/10; 714/15; 714/16; 714/23; 714/30; 714/51; 713/2

(58) Field of Classification Search ........... 714/10, 714/23, 51, 55
See application file for complete search history.

(56) References Cited

U.S. PATENT DOCUMENTS

| | | | |
|---|---|---|---|
| 4,974,147 A | 11/1990 | Hanrahan et al. | |
| 5,027,269 A | 6/1991 | Grant et al. | |
| 5,345,392 A * | 9/1994 | Mito et al. | 713/300 |
| 5,423,026 A | 6/1995 | Cook et al. | |
| 5,539,875 A | 7/1996 | Bishop et al. | |
| 5,581,693 A | 12/1996 | Pecone | |
| 5,615,335 A | 3/1997 | Onffroy et al. | |
| 5,630,078 A | 5/1997 | Fuoco et al. | |
| 5,696,897 A | 12/1997 | Dong | |
| 6,065,135 A | 5/2000 | Marshall et al. | |
| 6,175,930 B1 | 1/2001 | Arimilli et al. | |
| 6,502,190 B1 | 12/2002 | Faver | |
| 6,543,002 B1 * | 4/2003 | Kahle et al. | 714/10 |
| 6,898,731 B2 * | 5/2005 | Hack et al. | 714/10 |
| 2003/0061265 A1 * | 3/2003 | Maso et al. | 709/105 |
| 2003/0070123 A1 | 4/2003 | Meaney et al. | |

OTHER PUBLICATIONS

IBM Technical Disclosure Bulletin, "Recovery from Single Critical Hardware Resource Unavailability," vol. 36, No. 08, Aug. 1993, pp. 607-612.

(Continued)

*Primary Examiner*—Emerson C Puente
(74) *Attorney, Agent, or Firm*—William Konrad; Konrad Raynes & Victor LLP

(57) ABSTRACT

A method, apparatus and program storage device for providing self-quiesced logic for handling an error recovery instruction such as a reset or self-test instruction. For example, during a reset or self test procedure, the logic is isolated without adversely affecting the local processor. Self-quiesced logic processes an error recovery instruction by monitoring the processor interface for an idle condition and withholding access to the local processor. Once the local processor interface has been quiesced and the internal logic paths are idle, the logic will proceed with the reset or self-test.

3 Claims, 4 Drawing Sheets

OTHER PUBLICATIONS

IBM Research Disclosure, "Enhanced Peripheral Component Interconnect Bus Error Recovery," No. 427103, Nov. 1999, pp. 1524-1525.

S.P. Larky, "Converification Tames Cache and Bus Interface Controller Design", EETimes.com, pp. 1-7, [online], dated Sep., 1998, http://www.eetimes.com/editorial/1998/coverstory9809.html.

* cited by examiner

METHOD, APPARATUS AND PROGRAM STORAGE DEVICE FOR PROVIDING SELF-QUIESCED LOGIC TO HANDLE AN ERROR RECOVERY INSTRUCTION

BACKGROUND OF THE INVENTION

1. Field of the Invention

This invention relates in general to processor-based systems, and more particularly to a method, apparatus and program storage device for providing self-quiesced logic for handling an error recovery instruction such as a reset or self-test instruction.

2. Description of Related Art

A typical structure for a conventional computer system includes one or more processing units connected to a system memory device (random access memory or RAM) and to various peripheral, or input/output (I/O), devices such as a display monitor, a keyboard, a graphical pointer (mouse), and a permanent storage device (hard disk). The system memory device is used by a processing unit in carrying out program instructions, and stores those instructions as well as data values that are fed to or generated by the programs. A processing unit communicates with the other components by various means, including one or more interconnects (buses), or direct memory-access channels. A computer system may have many additional components, such as serial and parallel ports for connection to, e.g., printers, and network adapters. Other components might further be used in conjunction with the foregoing; for example, a display adapter might be used to control a video display monitor, a memory controller can be used to access the system memory, etc.

A bus architecture of a computer system conveys much of the information and signals involved in the computer system's operation. One or more busses are used to connect a central processing unit (CPU) to a memory and to input/output elements so that data and control signals can be readily transmitted between these different components. When the computer system executes its programming, it is imperative that data and information flow as fast as possible in order to make the computer as responsive as possible to the user. In typical hardware applications such as, graphics adapters, full motion video adapters, small computer systems interface (SCSI) host bus adapters, and the like, it is imperative that large block data transfers be accomplished expeditiously. These applications are just some examples of subsystems that benefit substantially from a fast bus transfer rate. In many computer system architectures of today, the majority of the above mentioned subsystems reside on the computer system's expansion bus.

The expansion bus is generally used as a method of adding functional components to the computer system. Devices are physically coupled to the expansion bus and use the expansion bus to communicate and exchange information. The peripheral component interconnect (PCI) bus comprises an industry standardized expansion bus architecture upon which many "peripheral" devices are manufactured.

In a typical computer system, a reset command may be issued or asserted by a component or device within the computer system. The reset command may instruct all of the components and devices within the computer system to reset to a state of initial conditions or an initial configuration. A component or device of a computer system receiving a reset command or in the process of executing a reset command may be said to be in reset or in a reset condition. A component or device of a computer system that is no longer receiving a reset command or has executed a reset command may be said to be out of reset.

In systems with a local processor, which handles error recovery, a reset of all the system, except the processor, is desirable in order to return the system to a known good state. Often the logic involved with the processor interface itself cannot be reset since it must actively participate in operations on the interface. It is clear that this logic is the most important to be at a known good state since it is involved in all accesses of the system by the local processor. Alternatively, the local processor may attempt to hold itself off the processor interface to the system for some defined amount of time until it believes the reset is completed. This can be especially difficult if the local processor instruction memory is accessed via the processor interface. These same difficulties are faced if the local processor wishes to instruct the system logic to perform a self-test.

In addition to the problems involved with resetting or testing logic on an active interface, the local processor must assure that any in progress data (e.g., posted write data to memory) has reached its destination prior to the procedure taking place or data may be lost. This can be difficult to determine and time consuming. It is desirable to limit the accesses to logic during error recovery as hang conditions may occur resulting in loss of error information and failure of error recovery.

It can be seen then that there is a need for a method, apparatus and program storage device for providing self-quiesced logic for handling an error recovery instruction such as a reset or self-test instruction.

SUMMARY OF THE INVENTION

To overcome the limitations in the prior art described above, and to overcome other limitations that will become apparent upon reading and understanding the present specification, the present invention discloses a method, apparatus and program storage device for providing self-quiesced logic for handling an error recovery instruction such as a reset or self-test instruction.

The present invention solves the above-described problems by isolating the logic during a reset or self-test procedure without adversely affecting the local processor. Self-quiesced logic processes a reset or a self-test instruction by monitoring the processor interface for an idle condition and withholding access to the local processor. Once the local processor interface has been quiesced and the internal logic paths are idle, the logic will proceed with the reset or self-test.

A program storage device readable by a computer tangibly embodies one or more programs of instructions executable by the computer to perform operations for determining when to perform an error recovery instruction in accordance with the principles of the present invention. The operations includes beginning a timeout task, monitoring processor status to determine a time to perform the error recovery instruction and performing the error recovery instruction when the monitoring determines a time for performing the error recovery.

In another embodiment of the present invention, another program storage device readable by a computer is disclosed. This program storage device tangibly embodying one or more programs of instructions executable by the computer to perform operations for determining when to perform an error recovery instruction, wherein the operations include receiving an error recovery instruction, monitoring processor status to determine a time to perform the error recovery instruction and performing the error recovery instruction when the monitoring determines a time for performing the error recovery.

In another embodiment of the present invention, an apparatus for quiescing processor control logic upon receipt of an error recovery instruction is disclosed. The apparatus includes self-quiesce logic, coupled to the timer, the self-quiesce logic receiving an error recovery instruction and a timer for determining when to force execution of the error recovery instruction, wherein the self-quiesce logic initiates the timer when the error recovery instruction is received, begins to monitor processor status to determine a time to perform the error recovery instruction and performs the error recovery instruction when the monitoring determines a time for performing the error recovery.

In another embodiment of the present invention, another apparatus for quiescing processor control logic upon receipt of an error recovery instruction is disclosed. This apparatus includes a processor for executing instructions and self-quiesce logic, coupled to the processor, the self-quiesce logic detecting an error recovery instruction, wherein the self-quiesce logic monitors processor status to determine a time to perform the error recovery instruction and performs the error recovery instruction when the monitoring determines a time for performing the error recovery.

In another embodiment of the present invention, a method for determining when to perform an error recovery instruction is disclosed. The method includes receiving an error recovery instruction, beginning a timeout task, monitoring processor status to determine a time to perform the error recovery instruction and performing the error recovery instruction when the monitoring determines a time for performing the error recovery.

In another embodiment of the present invention, another method for determining when to perform an error recovery instruction is disclosed. This method includes receiving an error recovery instruction, monitoring processor status to determine a time to perform the error recovery instruction and performing the error recovery instruction when the monitoring determines a time for performing the error recovery.

In another embodiment of the present invention, another apparatus for quiescing processor control logic upon receipt of an error recovery instruction is disclosed. This apparatus includes means for receiving an error recovery instruction and means for determining when to force execution of the error recovery instruction, wherein the means for receiving the error recovery instruction initiates the timer when the error recovery instruction is received, begins to monitor processor status to determine a time to perform the error recovery instruction and performs the error recovery instruction when a time for performing the error recovery is determined.

In another embodiment of the present invention, another apparatus for quiescing processor control logic upon receipt of an error recovery instruction is disclosed. This apparatus includes means for executing instructions and means, coupled to the means for executing instructions, for detecting an error recovery instruction, monitoring processor status to determine a time to perform the error recovery instruction and performing the error recovery instruction when a time for performing the error recovery is determined.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method, apparatus and program storage device for providing self-quiesced logic for handling an error recovery instruction such as a reset or self-test instruction. The present invention isolates the logic during a reset or self test procedure without adversely affecting the local processor. Self-quiesced logic processes a reset or a self-test instruction by monitoring the processor interface for an idle condition and withholding access to the local processor. Once the local processor interface has been quiesced and the internal logic paths are idle, the logic will proceed with the reset or self-test.

Figure 1:
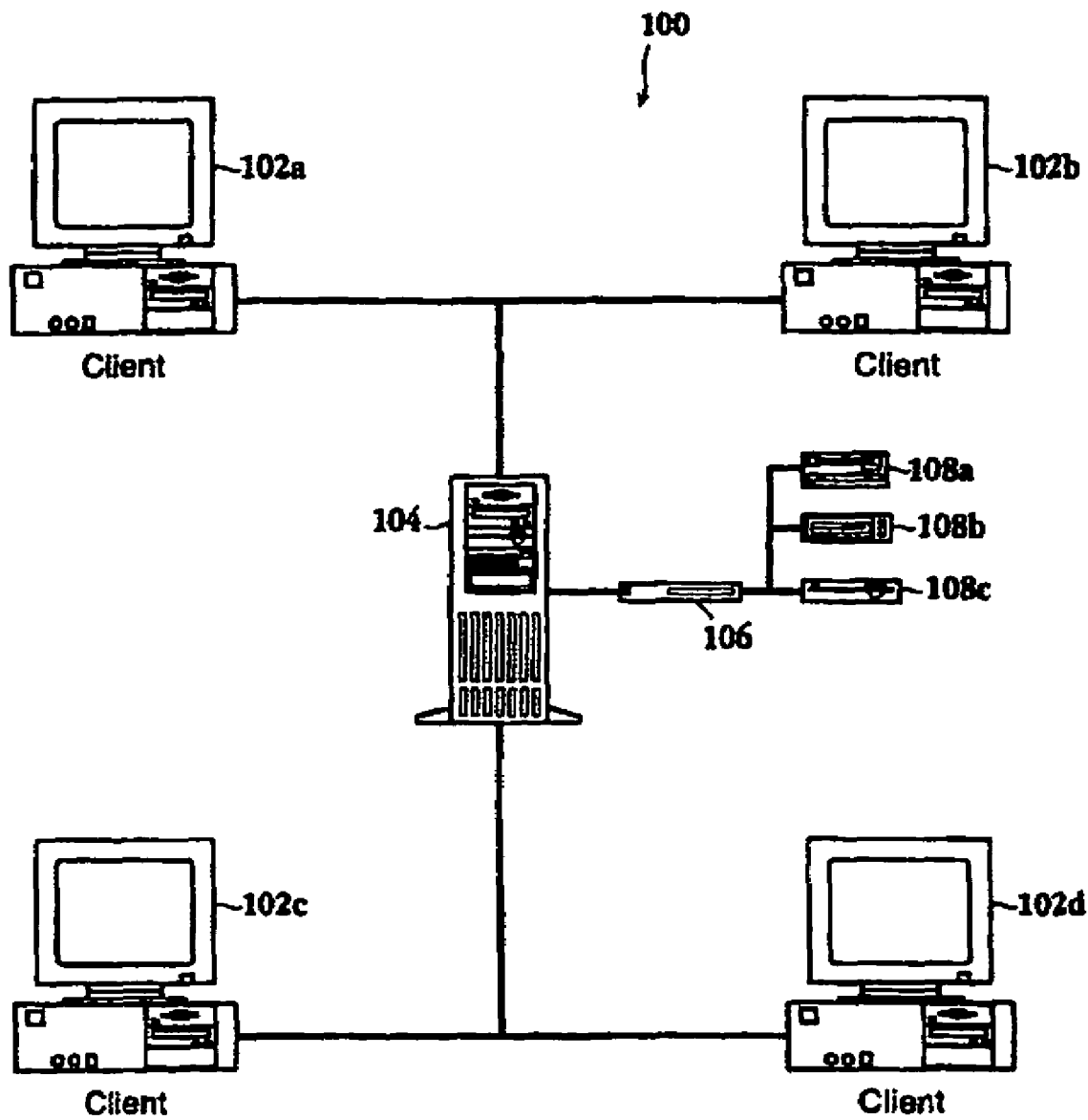
FIG. 1 shows a network diagram having several computers connected to a server computer.

FIG. 1 shows a network diagram 100 having several computers 102 connected to a server computer 104. In this arrangement, the computers 102 function as client computers, which are capable of storing and retrieving information from the server computer 104. In this example, the server computer 104 has a SCSI adapter card 106, which enables it to communicate with SCSI peripheral devices 108a through 108c. The server computer 104 also includes specialized software for handling communication between the client computers 102a through 102d and the SCSI peripheral devices 108a through 108c.

Figure 2:
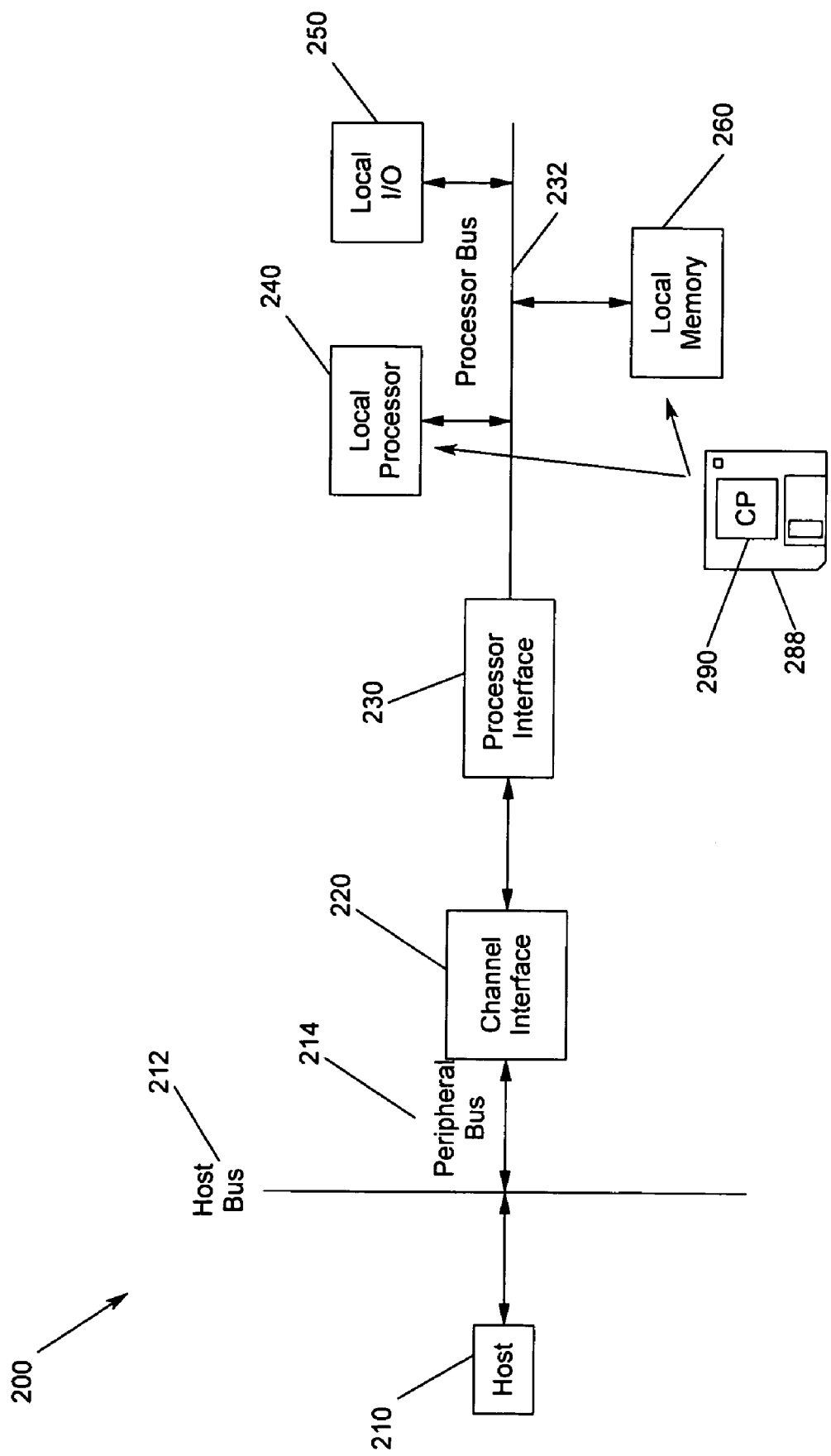
FIG. 2 illustrates a more detailed view of a computer system according to an embodiment of the present invention.

FIG. 2 illustrates a more detailed view of a computer system 200 according to an embodiment of the present invention. In FIG. 2, a host processor 210 is coupled to a host bus 212. A peripheral bus 214 couples the host bus 212 to the channel interface 220. The channel interface 220 is coupled to the processor interface 230. On the processor bus 232, a local processor 240 controls the activity. Data is provided to peripherals via the local input/output interface 250. Local memory 260 may also be coupled to the processor bus 232.

In systems with a local processor 240 that handle error recovery, a reset of all the system, except the local processor 240, is desirable in order to return the system to a known good state. Often the logic involved with the processor interface 230 cannot be reset since it must actively participate in operations on the local interface 230. The local processor 240 may attempt to hold itself off the processor interface 230 to the system for some defined amount of time until the local processor 240 believes the reset is completed. This can be especially difficult if the memory 260 containing processor instructions for the local processor 240 is accessed via the processor interface 230. These same difficulties are faced if the local processor 240 wishes to instruct the system logic to perform a self-test. In addition, the local processor 240 must assure that any in progress data has reached its destination prior to the procedure taking place or data may be lost. Hang conditions resulting in loss of error information and failure of error recovery may occur if accesses to logic is not limited during error recovery.

Figure 3:
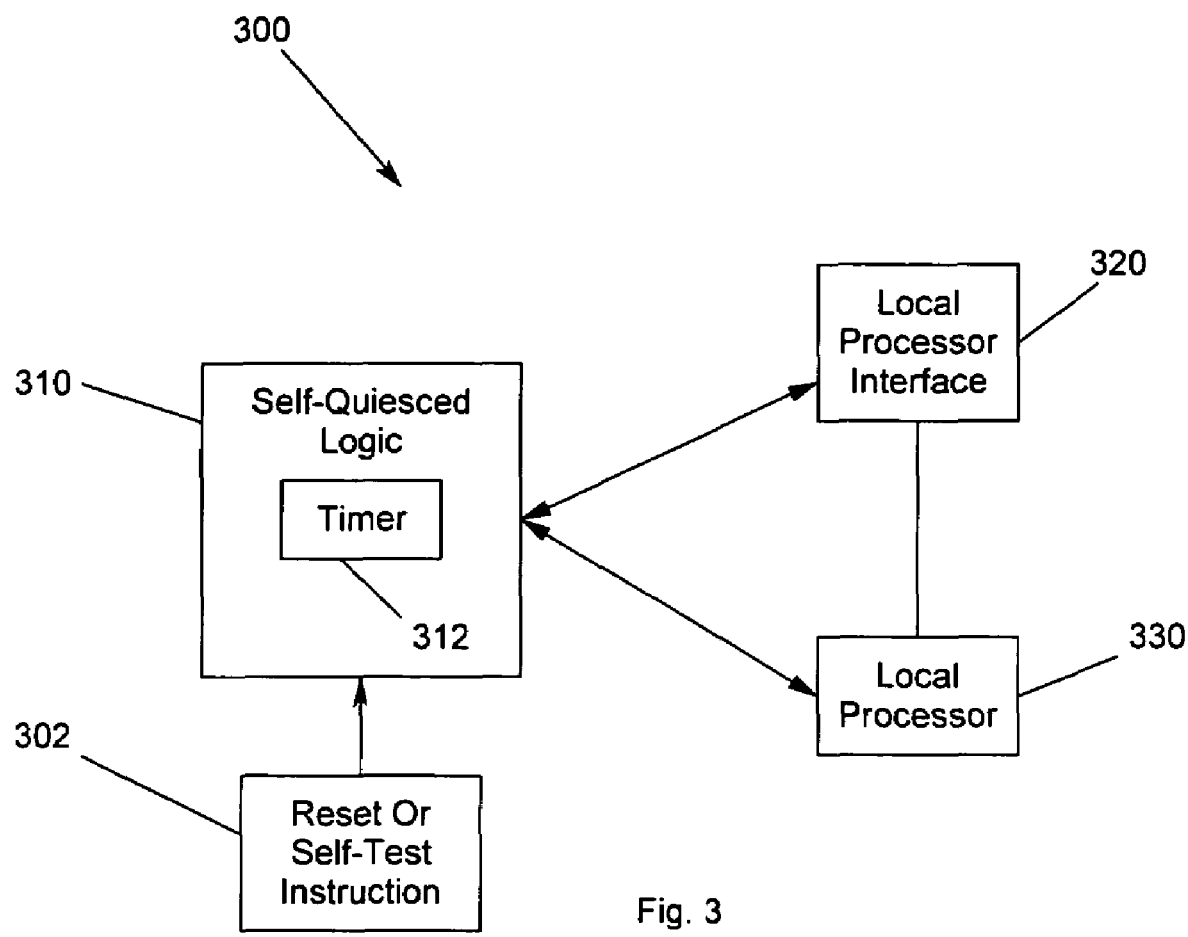
FIG. 3 is a block diagram showing the relationship between the self-quiesced logic, processor interface and the local processor according to an embodiment of the present invention.

FIG. 3 is a block diagram 300 showing the relationship between the self-quiesced logic, processor interface and the local processor according to an embodiment of the present invention. The self-quiesced logic 310 receives a reset or a self-test instruction 302. The self-quiesced logic 310 processes the reset or a self-test instruction 302 by monitoring the local processor interface 320 for an idle condition and withholding access to the local processor 330. Once the local processor interface 320 has been quiesced and the internal logic paths are idle, the logic will proceed with the reset or self-test.

A timer 312 may be provided to the self-quiesced logic 310 for forcing the reset or self test after a programmable amount of time has expired to avoid the system from becoming hung waiting for an event to occur. Once the local processor interface 320 has been quiesced and the internal logic paths are idle, the self-quiesced logic 310 will proceed with the reset or self-test. The timer 312 and self-quiesced logic 310 may be implemented in microcode, for example, in the local processor 330, a bus bridge, or other system component.

Figure 4:
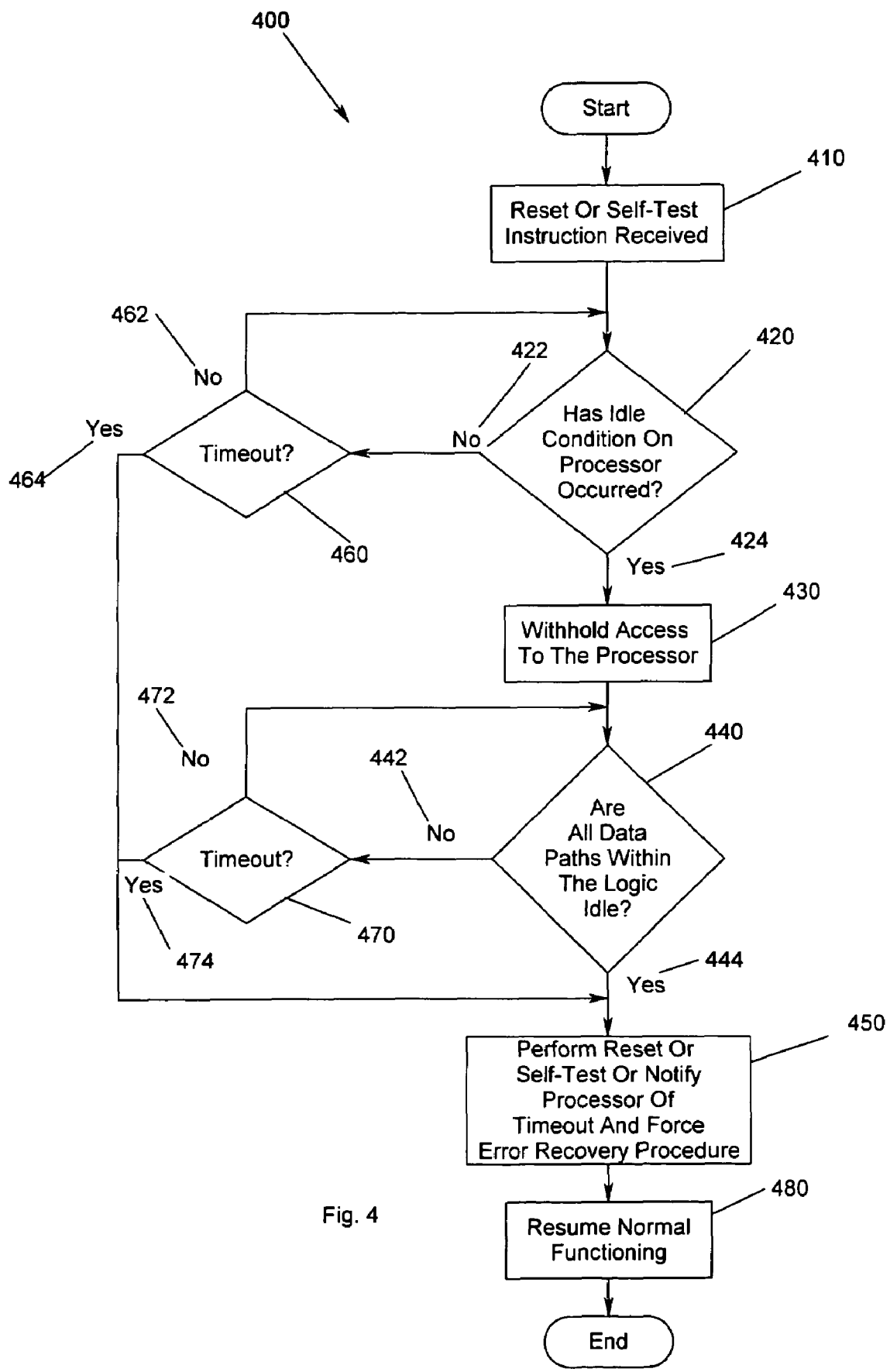
FIG. 4 is a flow chart for providing self-quiesced logic upon a reset or self-test instruction according to an embodiment of the present invention.

FIG. 4 is a flow chart 400 for providing self-quiesced logic upon a reset or self-test instruction according to an embodiment of the present invention. In FIG. 4, a reset signal or self-test instruction is received 410. Upon receipt of the reset signal or self-test instruction, a determination is made whether an idle condition on the processor interface occurs 420. If not 422, the system waits until an idle condition is detected. When an idle condition is detected 424, access to the interface to the local processor is withheld 430, e.g., hold grant inactive. All data transfer paths within the logic are interrogated for an idle condition 440, e.g., local processor write path to memory. If not 442, the data transfer paths continue to be monitored. The paths that should be considered during this time may optionally be programmably specified. Once the local processor interface has been quiesced and the internal logic paths are idle 444, the logic will proceed with the reset or self-test 450.

To avoid a hang condition waiting for the internal logic to go idle, a timeout 460, 470 may be considered for quiescing the local processor interface and idling the internal logic paths. If quiescing the local processor interface does not timeout 462, idle conditions on the processor continue to be monitored 420. If idling the internal logic paths does not timeout 472, idle data paths within the logic continue to be monitored 440. If after a programmable amount of time has expired 464, 474, the reset or self-test is forced or the local processor is notified of the time out and the error recovery request is forced 450. Note that this timeout may also be used if the local processor interface does not quiesce 422, but it is likely that the interface will be not be functional under those conditions.

The reset and not driven state of outputs on the local processor interface must be such as to maintain the quiesced state. For example a grant signal may be held inactive in order to keep users off the interface. Once the reset or self-test procedure has completed, the local processor interface resumes its normal functioning 480. It may be desirable to maintain some status on the reset (e.g., time-out occurred) outside of the reset and self-test area in order to provide information of the success of the procedure.

The process illustrated with reference to FIGS. 1-4 may be tangibly embodied in a computer-readable medium or carrier, e.g. one or more of the fixed and/or removable data storage devices 288 illustrated in FIG. 2, or other data storage or data communications devices. The computer program 290 may be loaded into memory 260 to configure processor 240 for execution. The computer program 290 includes instructions which, when read and executed by a processor 240 of FIG. 2, cause the devices to perform the steps necessary to execute the steps or elements of the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for determining when to perform an error recovery instruction, comprising:
    receiving an error recovery instruction;
    beginning a timeout task;
    monitoring a processor interface for an idle condition;
    withholding access to a local processor and performing the error recovery instruction in response to detecting an idle condition in said processor interface before expiration of said timeout task, wherein the withholding access to a local processor further comprises withholding access to the processor interface when the idle condition is detected;
    after access to the processor interface is withheld, interrogating data transfer paths in the processor interface to determine when the data paths are idle, wherein the instruction performing while access to the local processor is withheld includes performing the error recovery instruction when the data transfer paths are idle;
    forcing performance of the error recovery instruction before an idle condition in said processor interface is detected when the timeout task expires; and
    resuming normal operations after performing the error recovery instruction.

2. A program storage device readable by a computer, the program storage device tangibly embodying one or more programs of instructions executable by the computer to perform operations for determining when to perform an error recovery instruction, the operations comprising:
    receiving an error recovery instruction;
    beginning a timeout task;
    monitoring a processor interface for an idle condition;
    withholding access to a local processor and performing the error recovery instruction in response to detecting an idle condition in said processor interface before expiration of said timeout task, wherein the withholding access to a local processor further comprises withholding access to the processor interface when the idle condition is detected;
    after access to the processor interface is withheld, interrogating data transfer paths in the processor interface to determine when the data paths are idle, wherein the instruction performing while access to the local processor is withheld includes performing the error recovery instruction when the data transfer paths are idle;

forcing performance of the error recovery instruction before an idle condition in said processor interface is detected when the timeout task expires; and resuming normal operations after performing the error recovery instruction.

3. An apparatus for use with a local processor and for quiescing processor control logic upon receipt of an error recovery instruction, comprising:

self-quiesce logic for receiving an error recovery instruction; and a timer, coupled to the self-quiesce logic, for determining when to force execution of the error recovery instruction;

wherein the self-quiesce logic is adapted to begin a timeout task and initiate the timer when the error recovery instruction is received, begin to monitor a processor interface for an idle condition, detect an idle condition in said processor interface before expiration of said timer; in response to said detection, withhold access to a local processor, perform the error recovery instruction while access to the local processor is withheld, and force performance of the error recovery instruction before an idle condition in said processor interface is detected when the timer expires wherein after access to the processor interface is withheld, interrogate data transfer paths in the processor interface to determine when the data paths are idle, wherein the instruction performing while access to the local processor is withheld includes performing the error recovery instruction when the data transfer paths are idle, and resume normal operations after performing the error recovery instruction.

* * * * *